UNITED STATES PATENT OFFICE.

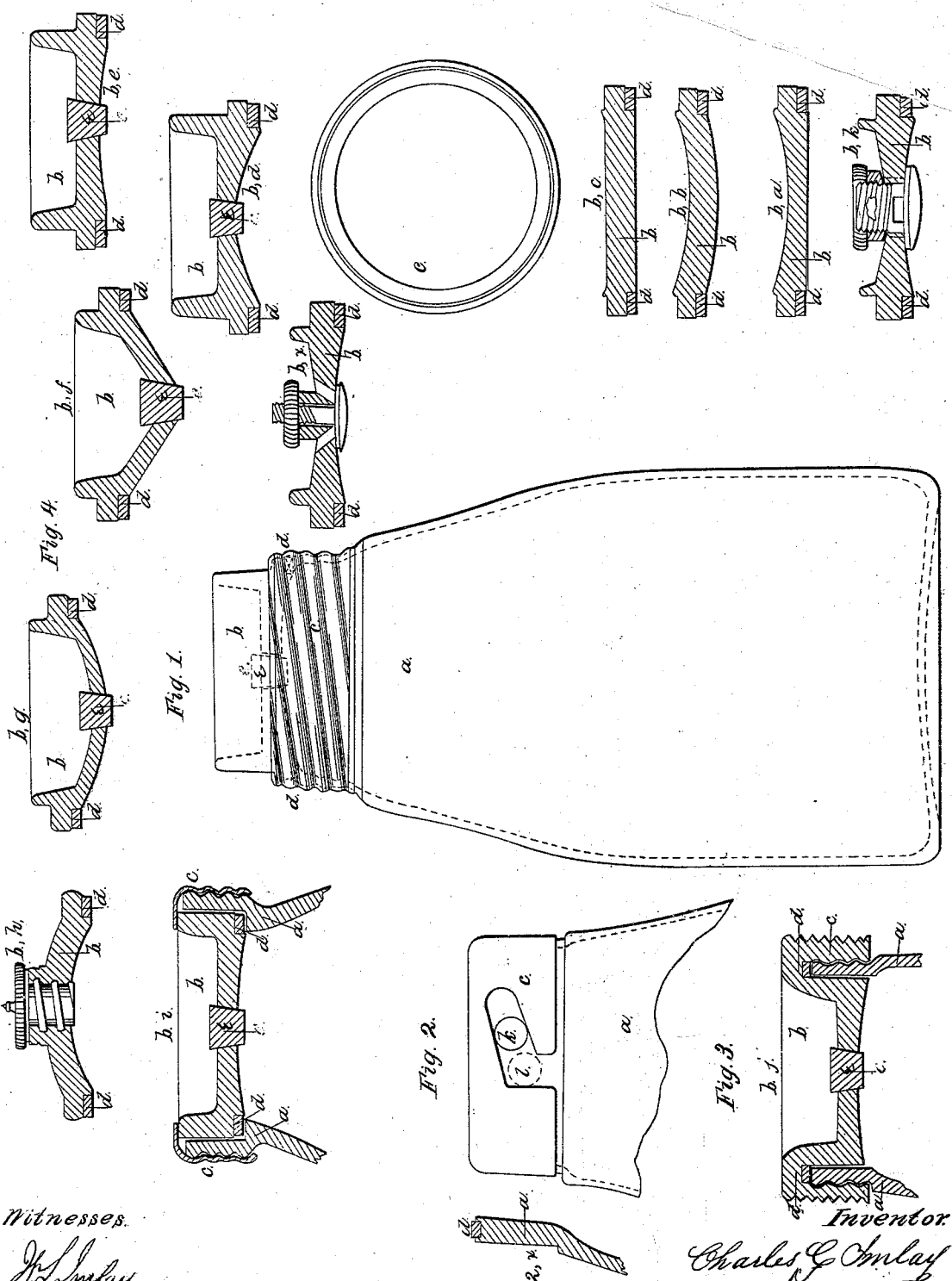

CHARLES G. IMLAY, OF PHILADELPHIA, PENNSYLVANIA.

IMPROVEMENT IN FRUIT-JARS.

Specification forming part of Letters Patent No. 47,834, dated May 23, 1865; antedated December 6, 1864.

*To all whom it may concern:*

Be it known that I, CHARLES G. IMLAY, of the city and county of Philadelphia, in the State of Pennsylvania, have invented certain Improvements in Fruit-Jars and other Vessels for Preserving Fruits or Similar Substances; and I do hereby declare that the following is a full and exact description thereof, reference being had to the annexed drawings, and to the letters of reference marked thereon.

My objects are twofold—

The first is securely to lock the main or principal joint of the jar, the only joint when no aperture is used. For this I make three forms of my cap, a sheet-metal screw-cap, a sheet-metal or cast slotted cap, and a glass screw-cap, each being fitted to corresponding parts of the jar.

Second, to make a series of stoppers adapted to my uses of them.

In Figure 1, $a$ is the jar; $b$, a stopper with an aperture closed by the india-rubber plug $z$. The joint between the glass stopper and the jar is made air-tight by the gasket $d$, which has no necessary contact with the metal cap $c$, the only use of the cap being to hold the stopper in firm contact with the jar by the screw-threads mutually made on the jar and cap.

Fig. 2 is another variety of my metal cap, used for the same purpose as stated, the glass stopper being locked to the jar by means of knobs or lugs, or short portions of screw-threads, operating in two or more inclined slots, $l$. A secondary variety of this cap is seen at $Q\ x$, in which case no glass stopper is used, but the gasket is compressed directly by the cap.

In Fig. 4, $c$, at the left hand, exhibits the top of the cap of Fig. 1, and to it are fitted the glass stoppers of all the series, except Fig. 3.

Fig. 3 is the same device as in Fig. 1, made either with or without the cap and plug $b$ and $z$, but the stopper and capping-screw edges are cast in one piece of glass; and for the sake of brevity these stoppers may be classed as two varieties, those without aperture or apertures as are $b\ a$, $b\ b$, and $b\ c$, of which still others may be given, and those with one or more apertures, as are the figures $b\ d$, $b\ e$, $b\ f$, $b\ h$, $b\ i$, $b\ k$, and $b\ x$, and the uses of each are apparent to adepts in the art of preserving, some rising above the caps, some being below, some excluding the air at the edges, others in part at the edges, and the rest of the air at the aperture or apertures.

The stoppers $b\ h$, $b\ k$, and $b\ x$ deserve notice as having their apertures locked by screw-plugs with rubber rings, $b\ h$ being solid, $b\ k$ a tube or tubular through the screw-rod, with or without the holes in the rod, or as indicated by the red dotted lines in the glass stopper, for the purpose of using the full capacity of the cup, and $b\ x$ has two holes at the base of the plug for the same purpose.

The uses and adaptation of my invention to fruits and other preserving is apparent to those skilled in the art to which it appertains.

I claim—

1. The use of the metal screw-cap $c$, for the purpose of locking any form or variety of glass stopper upon a glass jar, as described.

2. The glass stopper and cap $b\ j$, when fastened by screw-threads to the jar in the manner described.

3. A metal cap, when by inclined slots in the cap and by projections or lugs or portions of screw-threads on the neck of the jar it locks a glass stopper to a glass jar, and the same when no glass stopper is used.

4. The use of the hollow tube-plug $b\ k$ and plug $b\ x$, (with two apertures at its base,) for locking the aperture inside of the jar, as described.

5. All and each of the described and figured stoppers, when used in combination with my locking-caps.

C. G. IMLAY.

Witnesses:
SAMUEL J. PARKER,
W. L. IMLAY.